United States Patent
Konishi et al.

(10) Patent No.: US 11,248,770 B2
(45) Date of Patent: Feb. 15, 2022

(54) ILLUMINATION OPTICAL SYSTEM

(71) Applicants: STANLEY ELECTRIC CO., LTD., Tokyo (JP); NALUX CO., LTD., Osaka (JP)

(72) Inventors: Sadayuki Konishi, Tokyo (JP); Kayuri Kinoshita, Tokyo (JP); Kenta Ishii, Osaka (JP); Norihisa Sakagami, Osaka (JP); Daisuke Seki, Osaka (JP)

(73) Assignees: Stanley Electric Co., Ltd., Tokyo (JP); Nalux Co., Ltd., Osaka (JP)

( * ) Notice: Subject to any disclaimer, the term of this patent is extended or adjusted under 35 U.S.C. 154(b) by 0 days.

(21) Appl. No.: 17/105,001

(22) Filed: Nov. 25, 2020

(65) Prior Publication Data
US 2021/0080075 A1 Mar. 18, 2021

Related U.S. Application Data

(63) Continuation of application No. PCT/JP2018/030200, filed on Aug. 13, 2018.

(51) Int. Cl.
*F21V 5/04* (2006.01)
*G02B 5/18* (2006.01)
(Continued)

(52) U.S. Cl.
CPC .............. *F21V 5/04* (2013.01); *G02B 5/1814* (2013.01); *G02B 13/18* (2013.01); *G02B 19/0047* (2013.01); *G02B 27/425* (2013.01)

(58) Field of Classification Search
CPC .......... G02B 27/0037; G02B 27/0056; G02B 27/42; G02B 27/4211; G02B 5/1814
See application file for complete search history.

(56) References Cited

U.S. PATENT DOCUMENTS

| | | | |
|---|---|---|---|
| 6,870,805 B1 * | 3/2005 | Arai | G11B 7/1374 369/112.07 |
| 2001/0008513 A1 | 7/2001 | Arai et al. | |

(Continued)

FOREIGN PATENT DOCUMENTS

| | | |
|---|---|---|
| EP | 1 022 731 A2 | 7/2000 |
| EP | 1 100 078 A2 | 5/2001 |

(Continued)

OTHER PUBLICATIONS

International Search Report and Written Opinion dated Oct. 16, 2018 corresponding to International Patent Application No. PCT/JP2018/030200, and partial English translation thereof.

(Continued)

*Primary Examiner* — Rajarshi Chakraborty
*Assistant Examiner* — Michael Chiang
(74) *Attorney, Agent, or Firm* — Squire Patton Boggs (US) LLP

(57) ABSTRACT

An illumination optical system having a light source and a single convex lens with a diffractive structure, wherein the phase function of the diffractive structure is represented by $$\phi(r) = \sum_{i=1}^{N} \beta_{2i} r^{2i}$$

where r represents distance from the central axis of the lens, the relationship $$|\beta_2| \cdot (0.3R)^2 < |\beta_4| \cdot (0.3R)^4$$

is satisfied where R represents effective radius of the lens, the second derivative of the phase function has at least one extreme value and at least one point of inflection where r is greater than 30% of R, and the area of a surface of the light (Continued)

source is equal to or greater than 3% of the area of the entrance pupil when the light source side of the lens is defined as the image side.

8 Claims, 13 Drawing Sheets

(51) Int. Cl.
  *G02B 13/18* (2006.01)
  *G02B 19/00* (2006.01)
  *G02B 27/42* (2006.01)

(56) References Cited

U.S. PATENT DOCUMENTS

| | | |
|---|---|---|
| 2004/0027969 A1 | 2/2004 | Arai et al. |
| 2004/0095874 A1 | 5/2004 | Arai et al. |
| 2004/0095875 A1 | 5/2004 | Arai et al. |
| 2004/0136309 A1 | 7/2004 | Arai et al. |
| 2004/0257959 A1 | 12/2004 | Arai et al. |
| 2005/0254397 A1 | 11/2005 | Arai et al. |
| 2006/0007837 A1 | 1/2006 | Arai et al. |
| 2008/0137514 A1 | 6/2008 | Arai et al. |
| 2008/0175128 A1 | 7/2008 | Arai et al. |
| 2008/0316900 A1 | 12/2008 | Arai et al. |
| 2009/0016195 A1 | 1/2009 | Arai et al. |
| 2009/0147362 A1 | 6/2009 | Saito |
| 2012/0300301 A1* | 11/2012 | Ando ................ G02B 27/4211 359/565 |
| 2014/0029287 A1 | 1/2014 | Anzai et al. |

FOREIGN PATENT DOCUMENTS

| | | |
|---|---|---|
| EP | 1 118 986 A2 | 7/2001 |
| EP | 1 182 653 A1 | 2/2002 |
| EP | 1 369 855 A2 | 12/2003 |
| EP | 1 369 856 A2 | 12/2003 |
| EP | 1 381 035 A2 | 1/2004 |
| EP | 1 381 037 A2 | 1/2004 |
| EP | 2 690 348 A2 | 1/2014 |
| JP | 2000-221434 A | 8/2000 |
| JP | 2009-139897 A | 6/2009 |
| JP | 4649572 B2 | 3/2011 |
| JP | 4775674 B2 | 9/2011 |
| JP | 4798529 B2 | 10/2011 |
| JP | 2013-011909 A | 1/2013 |
| JP | 2014-026741 A | 2/2014 |
| JP | 2017-026787 A | 2/2017 |

OTHER PUBLICATIONS

International Search Report and Written Opinion dated May 15, 2018 corresponding to International Patent Application No. PCT/JP2018/005287, and partial English translation thereof.

* cited by examiner

ILLUMINATION OPTICAL SYSTEM

CROSS REFERENCE TO RELATED APPLICATION

This is a Continuation of International Patent Application No. PCT/JP2018/030200 filed Aug. 13, 2018, which designates the U.S.

TECHNICAL FIELD

The present invention relates to an illumination optical system used for headlamps of vehicles or the like.

BACKGROUND ART

In an illumination optical system used for headlamps of vehicles or the like, chromatic aberrations of lenses problematically cause color bleeding at the periphery of an area which is designed to be illuminated and around the boundary between an illuminated area and an unilluminated area. In order to reduce such color bleeding, the chromatic aberrations of lenses must be corrected. Under the above-described situation, an illumination optical system including a lens having a surface provided with a diffractive structure for correction of chromatic aberrations has been developed (for example JP2014-26741A).

However, an illumination optical system including a lens provided with a diffractive structure has the following problems First, so-called glare is generated by diffracted light of unintended orders of diffraction. The reason why the diffracted light of unintended orders of diffraction is generated is that diffraction efficiency changes depending on a position on a lens surface and an angle of incidence of a ray onto the lens, and consequently energy of the diffracted light transfers to unintended orders of diffraction. Secondly, a diffractive structure deteriorates transmittance.

Thus, an illumination optical system including a lens provided with a diffractive structure for correction of chromatic aberrations, the illumination optical system being capable of restraining generation of glare and deterioration in transmittance to a sufficient degree has not been developed.

Under the above-described situation, there is a need for an illumination optical system including a lens provided with a diffractive structure for correction of chromatic aberrations, the illumination optical system being capable of restraining generation of glare and deterioration in transmittance to a sufficient degree. The object of the present invention is to provide an illumination optical system including a lens provided with a diffractive structure for correction of chromatic aberrations, the illumination optical system being capable of restraining generation of glare and deterioration in transmittance to a sufficient degree.

SUMMARY OF THE INVENTION

An illumination optical system according to an embodiment of the present invention is provided with a light source and a single convex lens provided with a diffractive structure on a surface thereof. The phase function of the diffractive structure is represented by $$\phi(r) = \sum_{i=1}^{N} \beta_{2i} r^{2i}$$

where r represents distance from the central axis of the lens, $\beta$ represents coefficients, and N and i represent natural numbers, and the relationship $$|\beta_2|(0.3R)^2 < |\beta_4| \cdot (0.3R)^4$$

is satisfied where R represents effective radius of the lens. The second derivative with respect to r of the phase function has at least one extreme value and at least one point of inflection in the range of r where r is greater than 30% of the effective radius of the lens, a difference in spherical aberration between the maximum value and the minimum value for any r in $$0 \le r \le R$$

is equal to or less than the longitudinal chromatic aberration for any value of wavelength of visible light, and the diffractive structure is provided at least partially on the surface in the range of r where r is greater than 30% of the effective radius of the lens of the effective radius of the lens. The light source includes a surface having luminance in a predetermined range, and the area of the surface of the light source is equal to or greater than 3% of the area of the entrance pupil when the light source side of the lens is defined as the image side.

In the lens of the illumination optical system according to the embodiment of the present invention, by making the coefficient $\beta_2$ of the second order term of r of the phase function relatively small, and thus making the component of curvature of a spherical surface corresponding to the second order term is made relatively small, glare due to the diffracted lights other than the diffracted light of the designed order can be reduced. Further, the lens of the illumination optical system according to the embodiment of the present invention is configured such that the diffractive structure is provided at least partially on the surface in the range of r where r is greater than 30%, and second derivative with respect to r of the phase function has at least one extreme value and at least one point of inflection in the above-described range. Accordingly, when the lens is used in a combination with the light source described above, the chronical aberrations can be reduced in the above-described range while restraining decrease in transmittance of light through the lens.

In the illumination optical system according to another embodiment of the present invention, the surface of the light source is placed such that distance between the surface of the light source and a curved surface representing curvature of field of the lens when the light source side of the lens is defined as the image side is equal to or less than 3% of the focal length of the lens.

According to the present embodiment, by the employment of the light source provided with the surface provided along a curved surface representing field of curvature, field of curvature can be corrected to a very satisfactory extent.

In the illumination optical system according to another embodiment of the present invention, the second derivative with respect to r of the phase function has at least one extreme value and at least one point of inflection in the range of r where r is greater than 50% of the effective radius of the lens, and the diffractive structure is provided at least partially on the surface in the range of r where r is greater than 50% of the effective radius of the lens.

In the illumination optical system according to another embodiment of the present invention, the relationship $$0 < \frac{\beta_6^2}{\beta_4 \beta_8} < 5$$

is satisfied.

In the lens of the illumination optical system according to another embodiment of the present invention, $\beta_4$ and $\beta_8$ are negative and $\beta_6$ is positive.

In the lens of the illumination optical system according to another embodiment of the present invention, depth of the diffractive structure is corrected depending on r.

In the lens of the illumination optical system according to another embodiment of the present invention, the both side surfaces of the lens are convex.

In the illumination optical system according to another embodiment of the present invention, the surface of the light source is placed such that distance between the surface of the light source and a curved surface representing curvature of field of the lens when the light source side of the lens is defined as the image side is equal to or less than 1% of the focal length of the lens.

DESCRIPTION OF EMBODIMENTS

Figure 1:
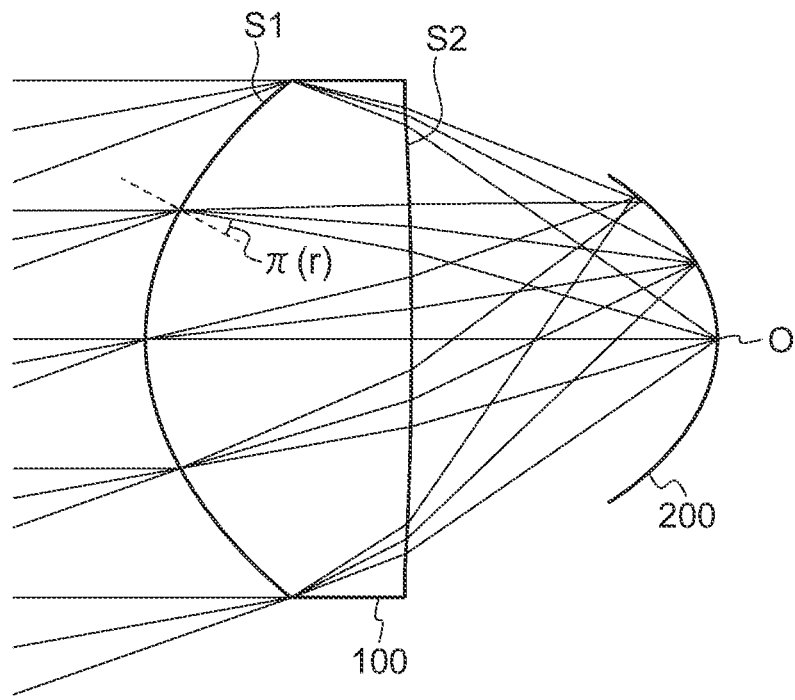
FIG. 1 illustrates a lens according to an embodiment of the present invention.

FIG. 1 illustrates an illumination optical system according to an embodiment of the present invention. Rays of light travelling from a light source 200 are projected through the lens 100. The surface on the light source side of the lens is represented by S2, and the surface on the opposite side of the lens from the light source is represented by S1. The surfaces S1 and S2 are represented by the following even function for an aspheric surface.

$$S(r) = \frac{cr^2}{1 + \sqrt{1-(1+k)c^2r^2}} + \sum_{i=1}^{N} \alpha_{2i} r^{2i} \quad (1)$$

S(r) represents a coordinate in the direction of the central axis of a lens, the origin being fixed at the vertex of a lens surface, r represents distance from the central axis, c represents curvature at the center of the surface, k represents a conic constant, α represents coefficients, and N and i represent natural numbers. The central axis of the lens is defined as the optical axis. In FIG. 1, a coordinate represented by S(r) is defined as positive when the coordinate is on the right side of the vertex of the lens surface. As shown in FIG. 1, the optical axis passes through the center O of the light source 200. The surfaces S1 and S2 are axially symmetric with respect to the optical axis. At first, the lens 100 of the illumination optical system will be described below.

Figure 2:
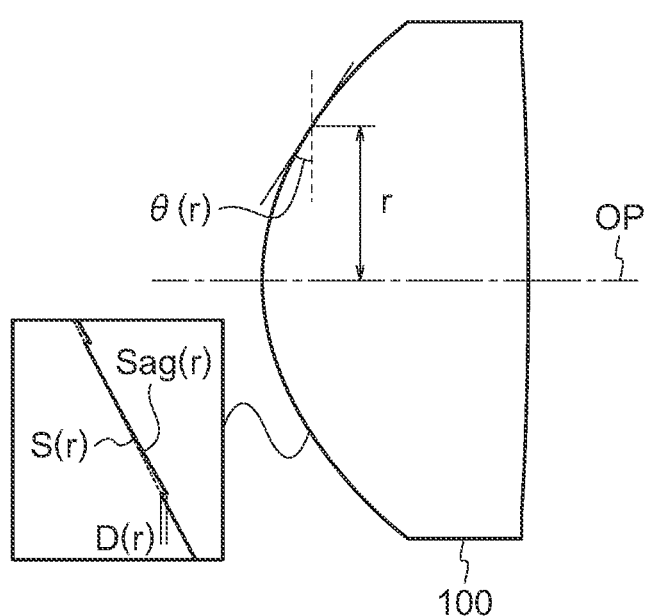
FIG. 2 illustrates a tangential angle of a lens surface.

FIG. 2 illustrates a tangential angle of a lens surface. The tangential angle θ is an angle formed by a tangential line on a lens surface and the direction perpendicular to the optical axis in a cross section containing the optical axis of the lens 100 and is represented by the following expression.

$$\theta(r) = \tan^{-1}\frac{dS}{dr} \quad (2)$$

Lenses according to the embodiments of the present invention are provided with a diffractive structure (a diffraction grating, for example) on the surface S1 or the surface S2.

In general, the following relationship holds among pitch P of a transmission-type diffractive structure, angle of incidence diffraction angle $\theta_{out}$, order of diffraction m, wavelength $\lambda$ of a ray of light, refractive index of a medium on the entry side and refractive index $n_{out}$ of a medium on the exit side.

$$P \cdot (n_{in} \cdot \sin\theta_{in} - n_{out} \cdot \sin\theta_{out}) = m\lambda$$

The diffraction angle $\theta_{out}$ of the m th order diffracted light can be changed by changing the pitch P.

The phase function of the first order diffracted light of the diffractive structure can be represented by an even degree polynomial of r as shown below.

$$\phi(r) = \sum_{i=1}^{N} \beta_{2i} r^{2i} \quad (3)$$

$\phi(r)$ represents the phase function, r represents distance from the central axis, $\beta$ represents coefficients, and N and i represent natural numbers. The unit of $\beta$ is determined such that the unit of $$\beta_{2i} r^{2i}$$

is radian.

An optical path difference function is represented as a product of $\lambda/2\Pi$ and the phase function. An r derivative of the optical path difference function corresponds to diffraction angle. Thus, the following relationship holds.

$$\frac{\lambda}{2\pi} \cdot \frac{d\phi(r)}{dr} = \sin\theta_{in} - \sin\theta_{out}$$

Accordingly, derivative with respect to r of the phase function is proportional to diffraction angle.

The shape of the diffractive structure will be described below. Assume that a ray of light travelling in the optical axis direction passes through the diffractive structure. Depth in the optical axis direction d(r) of the diffractive structure is represented by the following expression.

$$d(r) = \frac{\Delta\{\phi(r) - \eta(r)\}}{2\pi} \quad (4)$$

$\Delta$ in Expression (4) is represented by the following expression.

$$\Delta = \frac{\lambda}{(n-1)} \quad (5)$$

$\lambda$ represents the wavelength of a ray of light at which diffraction efficiency is maximized, and n represents refractive index of the diffractive structure at the wavelength. $\eta(r)$ in Expression (4) can be represented with a floor function by the following expression.

$$\eta(r) = \left\lfloor \frac{\phi}{2\pi} \right\rfloor \times 2\pi$$

The diffractive structure is provided on a lens surface, and d(r) is corrected according to a position on the lens surface and an angle of incidence of a ray of light onto the diffractive structure. A correcting factor for a position on the lens surface can be represented by the following expression using the tangential angle $\theta$.

$$T(r) = \frac{1}{\cos\theta(r)} \quad (6)$$

The above-described angle of incidence of a ray of light means an angle of incidence of a ray travelling from the center O of the light source onto the surface provided with the diffractive structure. FIG. 1 shows an angle of incidence $\Pi(r)$ of a ray of light onto the surface S1 provided with the diffractive structure. The angle of incidence $\Pi(r)$ of a ray of light is represented as a function of r by the following expression.

$$\Pi(r) = \gamma_1 r + \sum_{i=1}^{N} \gamma_{2i} r^{2i} \quad (7)$$

In Expression (7), $\gamma$ represents coefficients, and N and i represent natural numbers.

A correcting factor I(r) for an angle of incidence $\Pi(r)$ of a ray of light is represented by the following expression.

$$I(r) = \cos\frac{n_{in}}{n_{out}}\Pi(r) \quad (8)$$

In Expression (8), $n_{in}$ represents refractive index of a medium on the entry side, and $n_{out}$ represents refractive index of a medium on the exit side. The term $$\frac{n_{in}}{n_{out}}\Pi(r)$$

corresponds to the diffraction angle.

Depth in the optical axis direction D(r) of the diffractive structure is represented by the following expression, using Expressions (4), (6) and (8).

$$D(r) = T(r) \times I(r) \times d(r) \quad (9)$$

Figure 3:
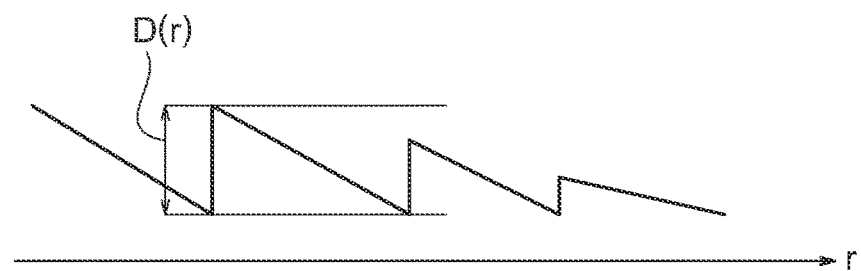
FIG. 3 is a conceptual diagram for illustrating depth in the optical axis direction D(r) of the diffractive structure.

FIG. 3 is a conceptual diagram for illustrating depth in the optical axis direction D(r) of the diffractive structure.

The absolute value of sag |Sag (r)| of the bottom of a groove of the diffractive structure is represented by the following expression, using Expressions (1) and (9).

$$|Sag(r)| = |S(r)| - D(r) \quad (10)$$

The achromatic feature of the diffractive structure will be described below. The Abbe number of the diffractive structure is −3.453.

In a single lens without a diffractive structure, spherical aberrations are determined by the component of curvature of a spherical surface of the lens. In an aberration diagram, the shapes of the curves representing relationships between spherical aberrations for respective values of wavelength and image height are similar. Abbe numbers represent chromatic aberrations corresponding to differences in spherical aberrations for respective values of wavelength. Values of Abbe number of lenses are positive.

Accordingly, by appropriately combining a lens having a positive value of Abbe number and a diffractive structure having a negative value of Abbe number, the lens can be achromatized, that is, differences in spherical aberrations for respective values of wavelength can be reduced.

As described above, spherical aberrations are determined by the component of curvature of a spherical surface of a lens, and in an aberration diagram, the shapes of the curves representing relationships between spherical aberrations for respective values of wavelength and image height are similar. Accordingly, in order to achromatize a lens with a diffractive structure, the second order term of r of the phase function, the term corresponding to the component of curvature of a spherical surface, is usually used. For example, longitudinal chromatic aberrations can be reduced using the second order term of r.

When the component of curvature of a spherical surface corresponding to the second order term of r of the phase function is great, however, differences in focal length between the designed first order diffracted light and diffracted lights other than the first order diffracted light are great, and magnifications of the diffracted lights other than the first order diffracted light change remarkably. Usually, in a diffractive structure, ratios of an amount of diffracted lights of orders different from the designed order to an amount of the light of the designed order are several percent, and when magnifications of the diffracted lights other than the light of the designed order are different from that of the light of the designed order, glare and color breakup due to the diffracted lights other than the light of the designed order appear to an extent that they can be recognized clearly.

In the present invention, the second order coefficient $\beta_2$ of r of the phase function is made relatively small. More specifically, $\beta_2$ and $\beta_4$ are determined such that the following relationship is satisfied, where R represents effective radius of the lens.

$$|\beta_2|\cdot(0.3R)^2 < |\beta_4|\cdot(0.3R)^4 \quad (11)$$

Signs of $\beta_4$, $\beta_6$ and $\beta_8$ preferably include at least one plus sign and at least one minus sign. Further, it is preferable that the sign of $\beta_4$ is identical with that of $\beta_8$ and different from that of $\beta_6$.

Further, the following relationship should preferably be satisfied.

$$0 < \frac{\beta_6^2}{\beta_4 \beta_8} < 5 \quad (12)$$

In a projection lens for headlamps, for example, correction of chromatic aberrations at a height close to that of the principal ray is not so important, and correction of chromatic aberrations against color breakup generated at the boundary between an illuminated area and an unilluminated area, that is, correction of chromatic aberrations at a position that is away from the principal ray is more important. Accordingly, even when the second order term of r of the phase function, the term corresponding to the component of curvature of a spherical surface, is made relatively small, correction of chromatic aberrations against color breakup generated at the boundary between an illuminated area and an unilluminated area can be carried out to a sufficient extent.

As described above, the first derivative of the phase function $$\frac{d\phi(r)}{dr}$$

is proportional to diffraction angle. Accordingly, the second derivative of the phase function $$\frac{d^2\phi(r)}{dr^2}$$

corresponds to a change of the diffraction angle.

At an extreme value or a point of inflection of the second derivative of the phase function, the diffraction angle changes remarkably. In fact, values of r corresponding to positions of distinctive points of a curve representing spherical aberration in an aberration diagram substantially agree with values of r of extreme values or values of r of points of inflection of the second derivative of the phase function. More specifically, in the vicinity of r corresponding to an extreme value of the second derivative of the phase function, extreme values of spherical aberrations for respective values of wavelength appear, and in the vicinity of r corresponding to a point of inflection of the second derivative of the phase function, the absolute values of spherical aberrations for respective values of wavelength are relatively small.

Accordingly, in order to effectively carry out correction of chromatic aberrations at a position that is away from the principal ray, the phase function should preferably be determined such that the second derivative of r of the phase function has at least one extreme value and at least one point of inflection in the range where r is greater than 30% or 50% of the effective radius R.

Further, the phase function should preferably be determined such that in an aberration diagram a difference in spherical aberration between the maximum value and the minimum value at any value of r in $$0 \leq r \leq R$$

is equal to or less than the longitudinal chromatic aberration, that is, the difference in spherical aberration between the maximum value and the minimum value at r=0 for any value of wavelength of visible light.

Further, a lens without a diffractive structure should be designed such that the longitudinal chromatic aberration is preferably 2 millimeters or less and more preferably 1.2 millimeters or less.

The examples of the present invention will be described below. The lenses of the examples are biconvex lenses. The lens thickness along the central axis is 33.0 millimeters, the lens diameter is 64 millimeters (the effective radius is 32 millimeters), and the refractive index of the lenses is 1.4973.

Example 1

The lens of Example 1 is provided with a diffractive structure on the surface S1.

The surfaces S1 and S2 are represented by the following even function for an aspheric surface.

$$S(r) = \frac{cr^2}{1 + \sqrt{1-(1+k)c^2r^2}} + \sum_{i=1}^{N} \alpha_{2i} r^{2i} \tag{1}$$

Table 1 shows values of constants and coefficients of Expression (1).

TABLE 1

|  | S1 (with diffractive structure) | S2 |
| --- | --- | --- |
| c | 2.60330E−02 | −4.84012E−03 |
| k | −1.00000E+00 | 0.00000E+00 |
| $\alpha_2$ | 0.00000E+00 | 0.00000E+00 |
| $\alpha_4$ | −2.05183E−06 | 9.75242E−07 |
| $\alpha_6$ | 3.38505E−09 | 0.00000E+00 |
| $\alpha_8$ | −9.42564E−13 | 0.00000E+00 |
| $\alpha_{10}$ | 0.00000E+00 | 0.00000E+00 |

The phase function of the diffractive structure on the surface S1 is represented by the following even degree polynomial of r.

$$\phi(r) = \sum_{i=1}^{N} \beta_{2i} r^{2i} \tag{3}$$

Table 2 shows values of coefficients of Expression (3) and values of Expression (5).

TABLE 2

| λ | 492.3 nm |
| --- | --- |
| n | 1.4973 |
| Δ | 989.92 nm |
| $\beta_2$ | 0.00000E+00 |
| $\beta_4$ | −1.80613E−02 |
| $\beta_6$ | 2.01057E−05 |
| $\beta_8$ | −7.26942E−09 |
| $\beta_{10}$ | 0.00000E+00 |

According to Table 2, $\beta_2$ is 0, and the following relationship is satisfied.

$$|\beta_2| \cdot (0.3R)^2 < |\beta_4| \cdot (0.3R)^4 \tag{11}$$

Further, from Table 2, the following value can be calculated.

$$\frac{\beta_6^2}{\beta_4 \beta_8} = 3.07886$$

Accordingly, the following relationship is satisfied.

$$0 < \frac{\beta_6^2}{\beta_4 \beta_8} < 5 \tag{12}$$

The angle of incidence $\Pi(r)$ of a ray of light onto the surface S1 is represented as a function of r by the following expression.

$$\Pi(r) = \gamma_1 r + \sum_{i=1}^{N} \gamma_{2i} r^{2i} \tag{7}$$

Table 3 shows values of coefficients of Expression (7).

TABLE 3

| $Y_1$ | 1.15528434 |
| --- | --- |
| $Y_2$ | −0.015836148 |
| $Y_4$ | 7.57675E−06 |
| $Y_6$ | 1.38968E−08 |
| $Y_8$ | −1.32952E−11 |

Figure 4:
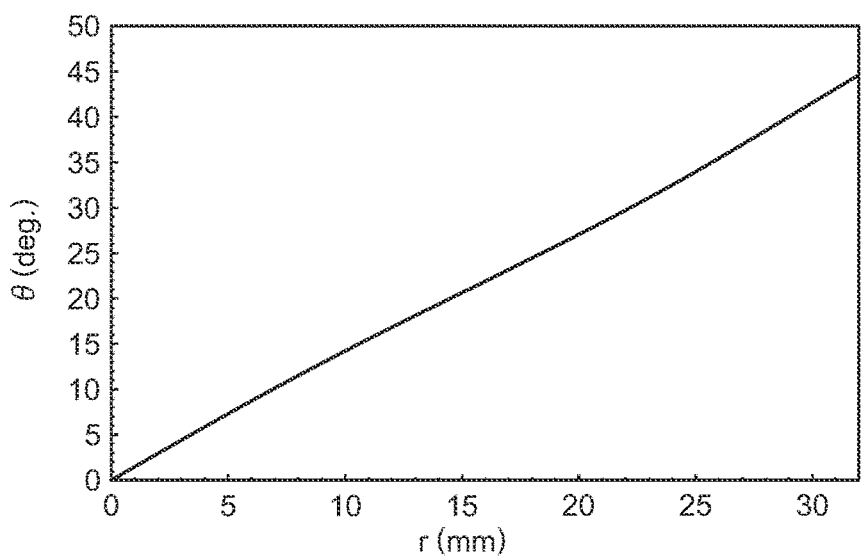
FIG. 4 shows a relationship between r and tangential angle θ on the surface S1 provided with the diffractive structure of the lens of Example 1.

FIG. 4 shows a relationship between r and tangential angle θ on the surface S1 provided with the diffractive structure of the lens of Example 1. The horizontal axis of FIG. 4 indicates distance r from the optical axis, and the unit is millimeter. The vertical axis of FIG. 4 indicates tangential angle θ represented by Expression (2), and the unit is degree.

Figure 5:
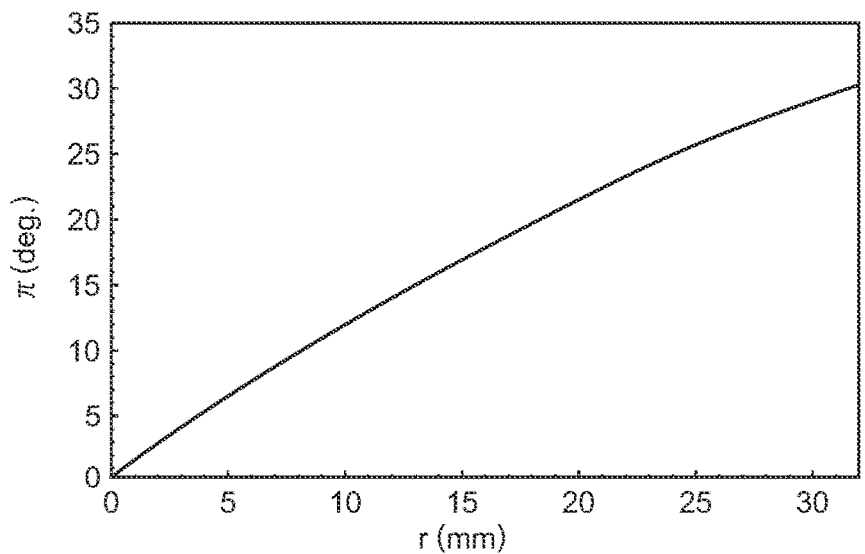
FIG. 5 shows a relationship between r and angle of incidence II(r) of a ray of light onto the surface S1 provided with the diffractive structure of the lens of Example 1.

FIG. 5 shows a relationship between r and angle of incidence $\Pi(r)$ of a ray of light onto the surface S1 provided with the diffractive structure of the lens of Example 1. The horizontal axis of FIG. 5 indicates distance r from the optical axis, and the unit is millimeter. The vertical axis of FIG. 5 indicates angle of incidence $\Pi(r)$ of a ray of light represented by Expression (7), and the unit is degree.

Figure 6:
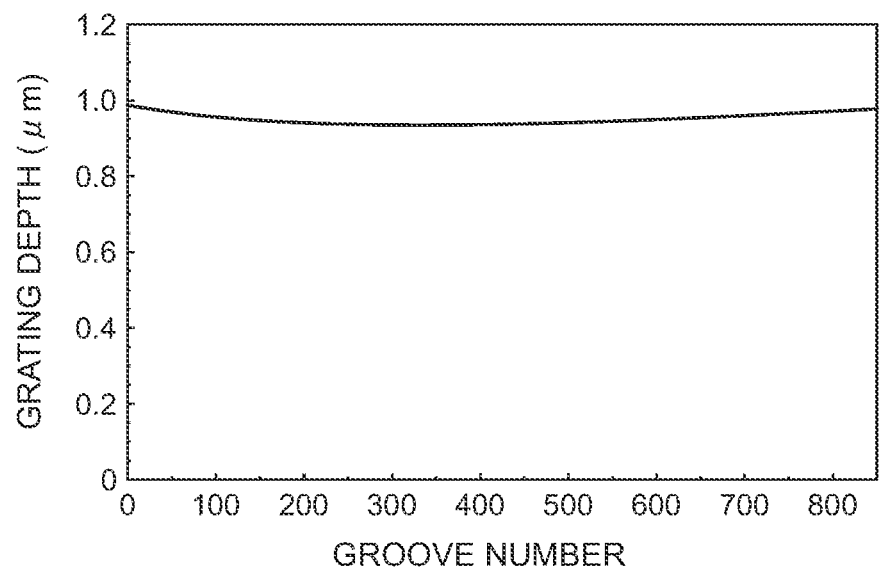
FIG. 6 shows a relationship between groove number and grating depth corresponding to each groove (depth of groove) in the diffractive structure of the lens of Example 1.

FIG. 6 shows a relationship between groove number and grating depth of each groove (depth of groove) in the diffractive structure of the lens of Example 1. The groove numbers are assigned sequentially from the optical axis to the periphery of the lens. The horizontal axis of FIG. 6 indicates groove number. The vertical axis of FIG. 6 indicates grating depth of each groove, and the unit is micrometer.

Figure 7:
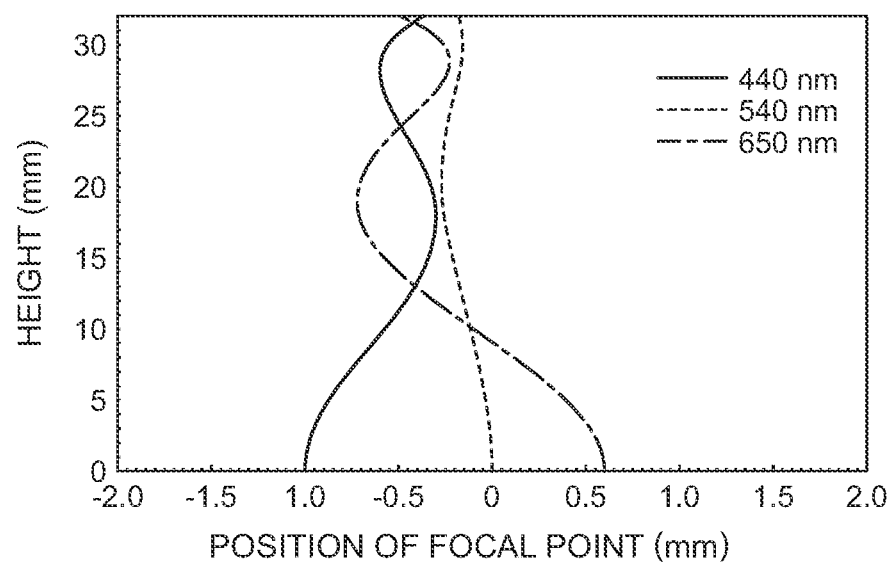
FIG. 7 shows spherical aberrations of the lens provided with the diffractive structure of Example 1.

FIG. 7 shows spherical aberrations of the lens provided with the diffractive structure of Example 1. The horizontal axis of FIG. 7 indicates position of focal point along the optical axis, and the unit is millimeter. The vertical axis of FIG. 7 indicates image height, that is, height of incident rays parallel to the optical axis with respect to the optical axis, and the unit is millimeter. According to FIG. 7, the longitudinal chromatic aberration is 1.7 millimeters. In the whole range of image height, a difference in spherical aberration between the maximum value and the minimum value for each wavelength is equal to or less than the value of the longitudinal chromatic aberration. The effective radius R is 32 millimeters, and in the range of $$r/R \geq 0.3$$

of the vertical axis, a difference in spherical aberration between the maximum value and the minimum value for each wavelength is equal to or less than 30% of the value of the longitudinal chromatic aberration.

Figure 8:
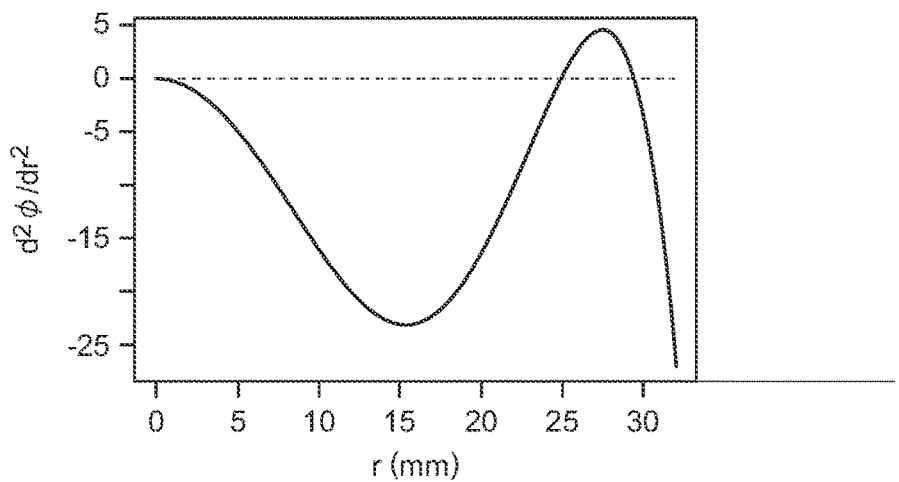
FIG. 8 shows second derivative with respect to r of the phase function of Example 1.

FIG. 8 shows second derivative with respect to r of the phase function of Example 1. The horizontal axis of FIG. 8 indicates r, and the unit is millimeter. The vertical axis of FIG. 8 indicates second derivative.

Figure 9:
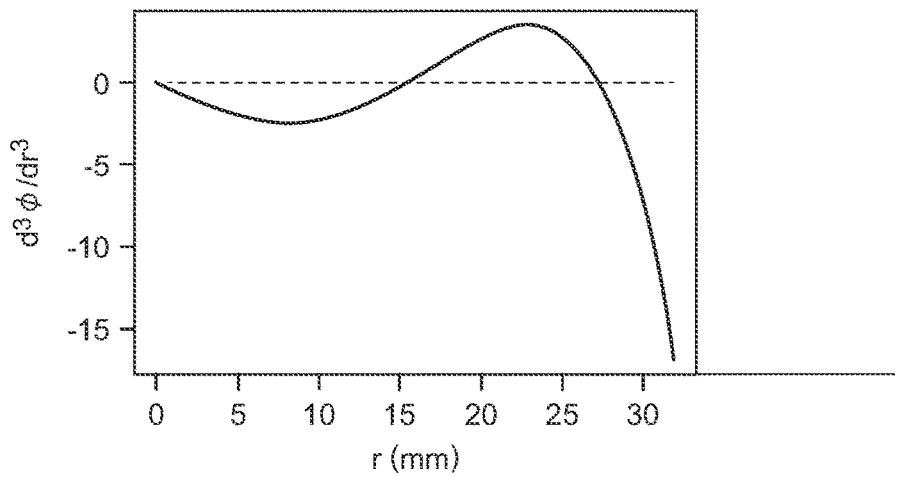
FIG. 9 shows third derivative with respect to r of the phase function of Example 1.

FIG. 9 shows third derivative with respect to r of the phase function of Example 1. The horizontal axis of FIG. 9 indicates r, and the unit is millimeter. The vertical axis of FIG. 9 indicates third derivative.

Figure 10:
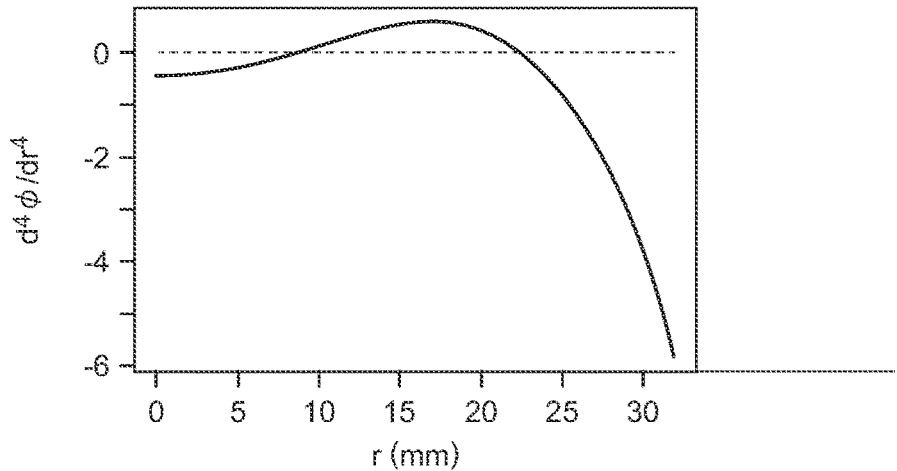
FIG. 10 shows fourth derivative of r of the phase function of Example 1.

FIG. 10 shows fourth derivative with respect to r of the phase function of Example 1. The horizontal axis of FIG. 10 indicates r, and the unit is millimeter. The vertical axis of FIG. 10 indicates fourth derivative.

According to FIGS. 8-10, second derivative with respect to r of the phase function has extreme values at r=15 and r=27, and has points of inflection at r=8 and r=22. The effective radius R is 32 millimeters, and second derivative with respect to r of the phase function has two extreme values and one point of inflection in the range of $r/R \geq 0.3$, , and has one extreme value and one point of inflection in the range of $r/R \geq 0.5$.

Example 2

The lens of Example 2 is provided with a diffractive structure on the surface S2.

The surfaces S1 and S2 are represented by the following even function for an aspheric surface.

$$S(r) = \frac{cr^2}{1 + \sqrt{1-(1+k)c^2r^2}} + \sum_{i=1}^{N} \alpha_{2i} r^{2i} \quad (1)$$

Table 4 shows values of constants and coefficients of Expression (1).

TABLE 4

|  | S1 | S2 (with diffractive structure) |
|---|---|---|
| C | 3.08729E−02 | −5.51711E−03 |
| K | −1.05001E+00 | 1.03188E+00 |
| $\alpha_2$ | 0.00000E+00 | 0.00000E+00 |
| $\alpha_4$ | 2.41612E−06 | 3.20000E−06 |
| $\alpha_6$ | 4.05612E−11 | −1.66000E−09 |
| $\alpha_8$ | 0.00000E+00 | 0.00000E+00 |
| $\alpha_{10}$ | 0.00000E+00 | 0.00000E+00 |

The phase function of the diffractive structure on the surface S2 is represented by the following even degree polynomial of r.

$$\phi(r) = \sum_{i=1}^{N} \beta_{2i} r^{2i} \quad (3)$$

Table 5 shows values of coefficients of Expression (3) and values of Expression (5).

TABLE 5

| λ | 492.3 nm |
|---|---|
| n | 1.4973 |
| Δ | 989.92 nm |
| $\beta_2$ | 0.00000E+00 |
| $\beta_4$ | −2.44001E−02 |
| $\beta_6$ | 5.03007E−05 |
| $\beta_8$ | −5.17006E−08 |
| $\beta_{10}$ | 2.13000E−11 |

According to Table 5, $\beta_2$ is 0, and the following relationship is satisfied.

$|\beta_2| \cdot (0.3R)^2 < |\beta_4| \cdot (0.3R)^4 \quad (11)$

Further, from Table 5, the following value can be calculated.

$$\frac{\beta_6^2}{\beta_4 \beta_8} = 2.00568$$

Accordingly, the following relationship is satisfied.

$$0 < \frac{\beta_6^2}{\beta_4 \beta_8} < 5 \quad (12)$$

The angle of incidence II(r) of a ray of light onto the surface S2 is represented as a function of r by the following expression.

$$\Pi(r) = \gamma_1 r + \sum_{i=1}^{N} \gamma_{2i} r^{2i} \quad (7)$$

Table 6 shows values of coefficients of Expression (7).

TABLE 6

| $Y_1$ | 1.208888165 |
|---|---|
| $Y_2$ | 0.002086964 |
| $Y_4$ | −8.94647E−06 |
| $Y_6$ | −3.83905E−09 |
| $Y_8$ | 1.02306E−11 |

Figure 11:
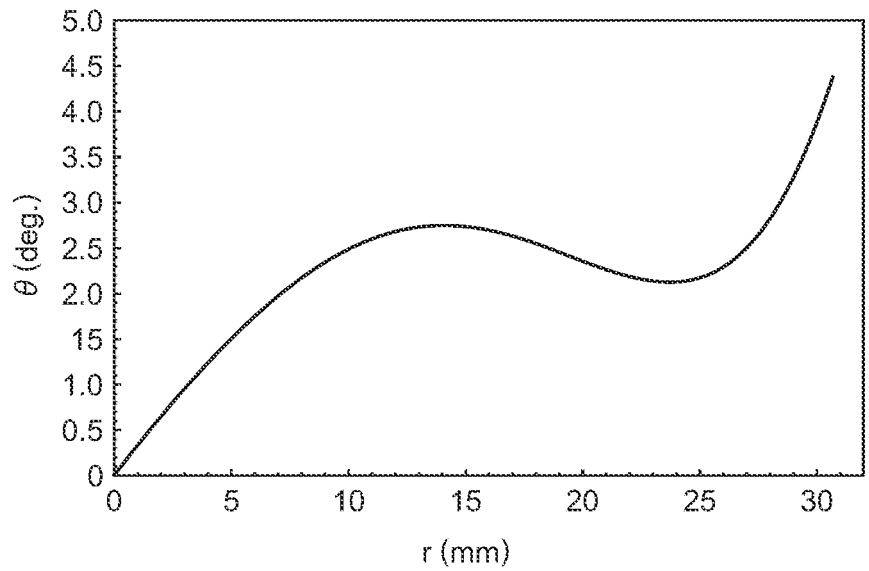
FIG. 11 shows a relationship between r and tangential angle θ on the surface S2 provided with the diffractive structure of the lens of Example 2.

FIG. 11 shows a relationship between r and tangential angle θ on the surface S2 provided with the diffractive structure of the lens of Example 2. The horizontal axis of FIG. 11 indicates distance r from the optical axis, and the unit is millimeter. The vertical axis of FIG. 11 indicates tangential angle θ represented by Expression (2), and the unit is degree.

Figure 12:
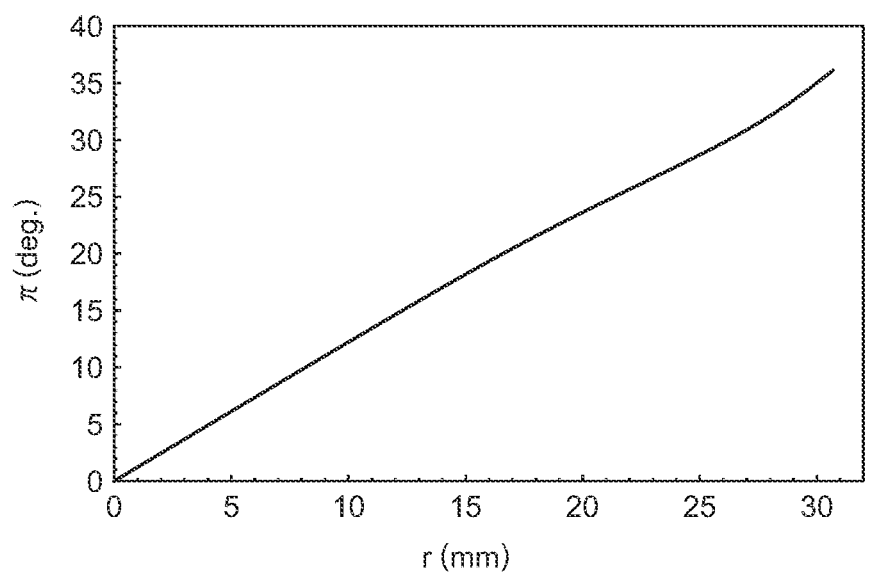
FIG. 12 shows a relationship between r and angle of incidence MO of a ray of light onto the surface S2 provided with the diffractive structure of the lens of Example 2.

FIG. 12 shows a relationship between r and angle of incidence II(r) of a ray of light onto the surface S2 provided with the diffractive structure of the lens of Example 2. The horizontal axis of FIG. 12 indicates distance r from the optical axis, and the unit is millimeter. The vertical axis of FIG. 12 indicates angle of incidence II(r) of a ray of light represented by Expression (7), and the unit is degree.

Figure 13:
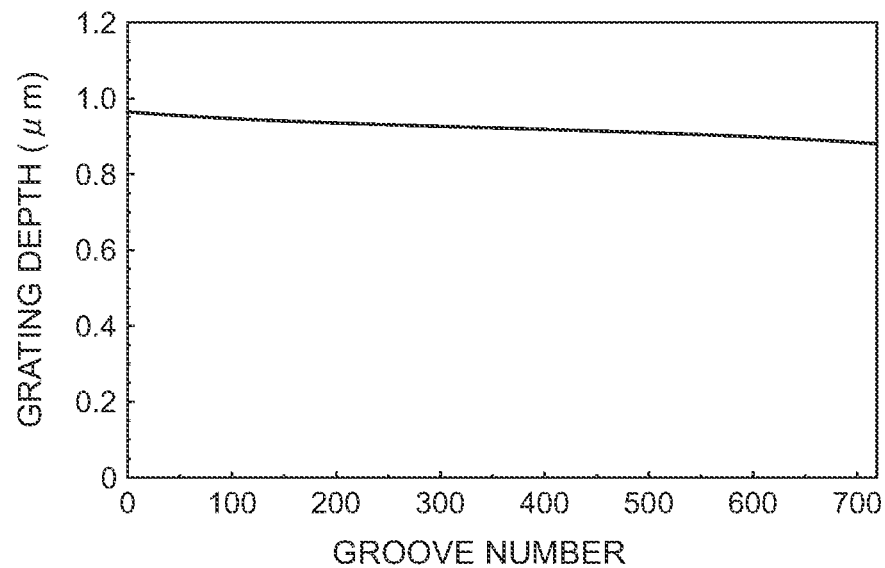
FIG. 13 shows a relationship between groove number and grating depth corresponding to each groove (depth of groove) in the diffractive structure of the lens of Example 2.

FIG. 13 shows a relationship between groove number and grating depth of each groove (depth of groove) in the diffractive structure of the lens of Example 2. The groove numbers are assigned sequentially from the optical axis to the periphery of the lens. The horizontal axis of FIG. 13 indicates groove number. The vertical axis of FIG. 13 indicates grating depth of each groove, and the unit is micrometer.

Figure 14:
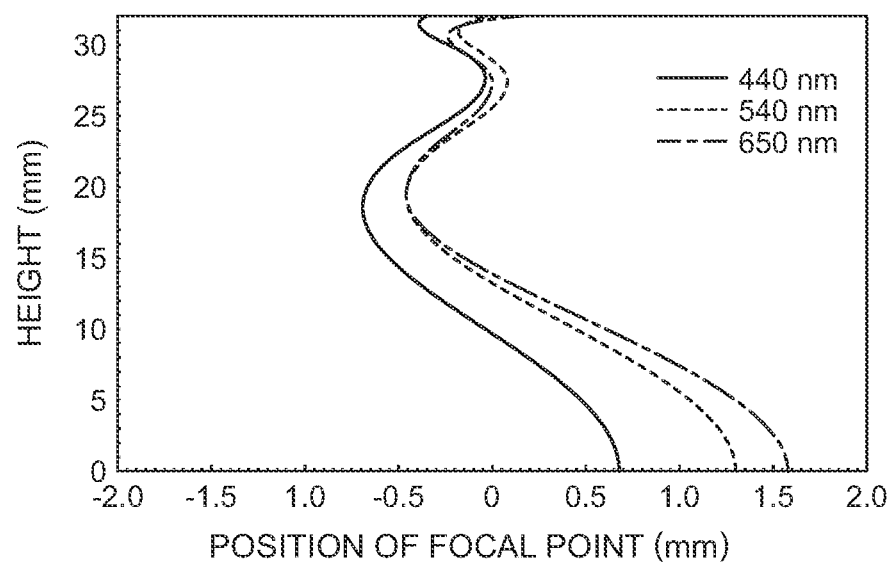
FIG. 14 shows spherical aberrations of the lens provided with the diffractive structure of Example 2.

FIG. 14 shows spherical aberrations of the lens provided with the diffractive structure of Example 2. The horizontal axis of FIG. 14 indicates position of focal point along the optical axis, and the unit is millimeter. The vertical axis of FIG. 14 indicates image height, that is, height of incident rays parallel to the optical axis with respect to the optical axis, and the unit is millimeter. According to FIG. 14, the longitudinal chromatic aberration is 0.9 millimeters. In the whole range of image height, a difference in spherical aberration between the maximum value and the minimum value for each wavelength is equal to or less than the value of the longitudinal chromatic aberration. The effective radius R is 32 millimeters, and in the range of $r/R \geq 0.3$ of the vertical axis, a difference in spherical aberration between the maximum value and the minimum value for each wavelength is equal to or less than 70% of the value of the longitudinal chromatic aberration.

Figure 15:
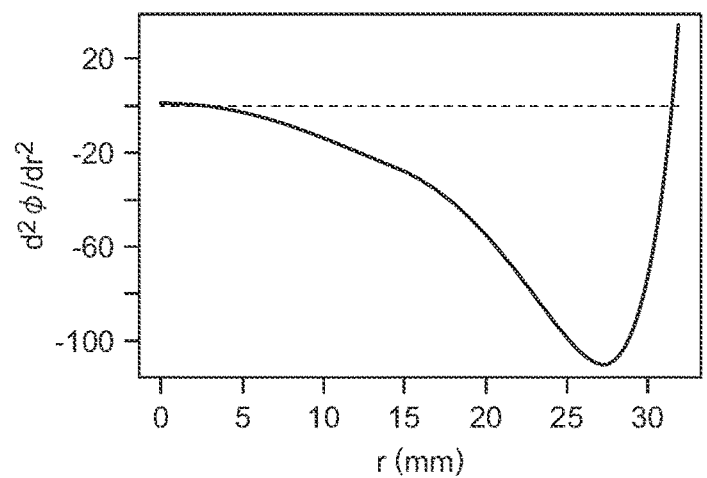
FIG. 15 shows second derivative with respect to r of the phase function of Example 2.

FIG. 15 shows second derivative with respect to r of the phase function of Example 2. The horizontal axis of FIG. 15 indicates r, and the unit is millimeter. The vertical axis of FIG. 15 indicates second derivative.

Figure 16:
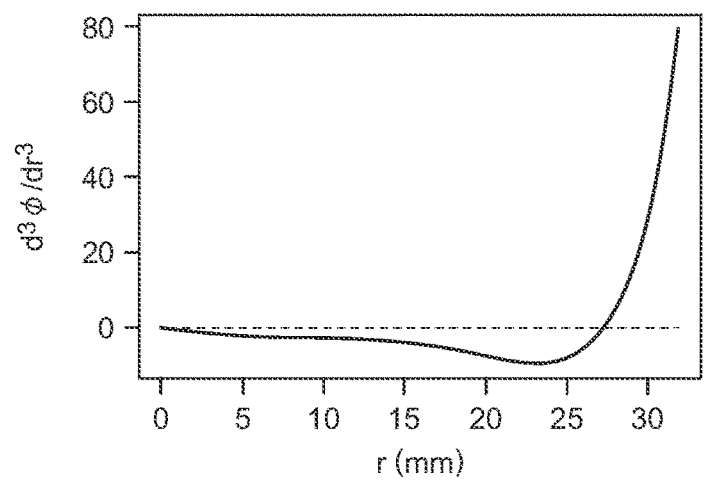
FIG. 16 shows third derivative with respect to r of the phase function of Example 2.

FIG. 16 shows third derivative with respect to r of the phase function of Example 2. The horizontal axis of FIG. 16 indicates r, and the unit is millimeter. The vertical axis of FIG. 16 indicates third derivative.

Figure 17:
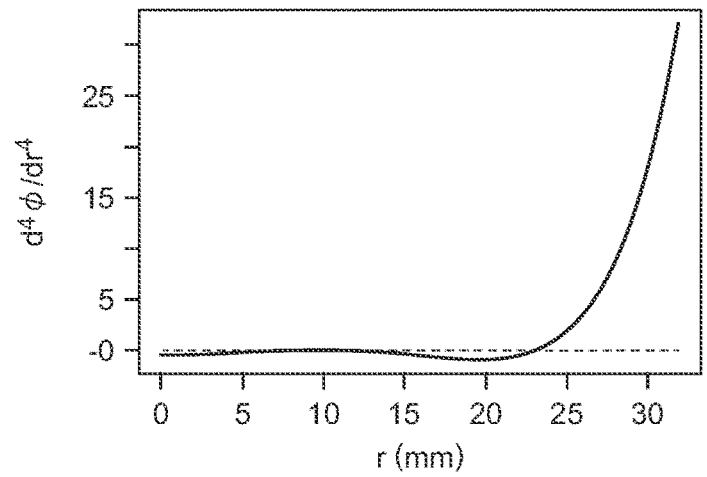
FIG. 17 shows fourth derivative with respect to r of the phase function of Example 2.

FIG. 17 shows fourth derivative with respect to r of the phase function of Example 2. The horizontal axis of FIG. 17 indicates r, and the unit is millimeter. The vertical axis of FIG. 17 indicates fourth derivative.

According to FIGS. 15-17, second derivative with respect to r of the phase function has an extreme value at r=27, and has points of inflection at r=11 and r=23. The effective radius R is 32 millimeters, and second derivative with respect to r of the phase function has one extreme value and two points of inflection in the range of $r/R \geq 0.3$, and has one extreme value and one point of inflection in the range of $r/R \geq 0.5$.

Example 3

The lens of Example 3 is provided with a diffractive structure on the surface S1.

The surfaces S1 and S2 are represented by the following even function for an aspheric surface.

$$S(r) = \frac{cr^2}{1 + \sqrt{1-(1+k)c^2r^2}} + \sum_{i=1}^{N} \alpha_{2i} r^{2i} \tag{1}$$

Table 7 shows values of constants and coefficients of Expression (1).

TABLE 7

|  | S1 (with diffractive structure) | S2 |
| --- | --- | --- |
| c | 3.31362E−02 | −2.27662E−03 |
| k | −1.00000E+00 | 0.00000E+00 |
| $\alpha_2$ | 0.00000E+00 | 0.00000E+00 |
| $\alpha_4$ | −2.76448E−06 | 0.00000E+00 |
| $\alpha_6$ | 9.54570E−09 | 0.00000E+00 |
| $\alpha_8$ | −9.19235E−12 | 0.00000E+00 |
| $\alpha_{10}$ | 3.26366E−15 | 0.00000E+00 |

The phase function of the diffractive structure on the surface S1 is represented by the following even degree polynomial of r.

$$\phi(r) = \sum_{i=1}^{N} \beta_{2i} r^{2i} \tag{3}$$

Table 8 shows values of coefficients of Expression (3) and values of Expression (5).

TABLE 8

| λ | 492.3 nm |
| --- | --- |
| n | 1.4973 |
| Δ | 989.92 nm |
| $\beta_2$ | 0.00000E+00 |
| $\beta_4$ | −2.36108E−02 |
| $\beta_6$ | 4.45979E−05 |
| $\beta_8$ | −4.13122E−08 |
| $\beta_{10}$ | 1.41398E−11 |

According to Table 8, $\beta_2$ is 0, and the following relationship is satisfied.

$$|\beta_2| \cdot (0.3R)^2 < |\beta_4| \cdot (0.3R)^4 \tag{11}$$

Further, from Table 8, the following value can be calculated.

$$\frac{\beta_6^2}{\beta_4 \beta_8} = 2.03911$$

Accordingly, the following relationship is satisfied.

$$0 < \frac{\beta_6^2}{\beta_4 \beta_8} < 5 \tag{12}$$

The angle of incidence II(r) of a ray of light onto the surface S1 is represented as a function of r by the following expression.

$$\Pi(r) = \gamma_1 r + \sum_{i=1}^{N} \gamma_{2i} r^{2i} \tag{7}$$

Table 9 shows values of coefficients of Expression (7).

TABLE 9

| $Y_1$ | 1.34210E+00 |
| --- | --- |
| $Y_2$ | −1.93586E−02 |
| $Y_4$ | 2.62334E−05 |
| $Y_6$ | −3.49328E−08 |
| $Y_8$ | 1.55802E−11 |

Figure 18:
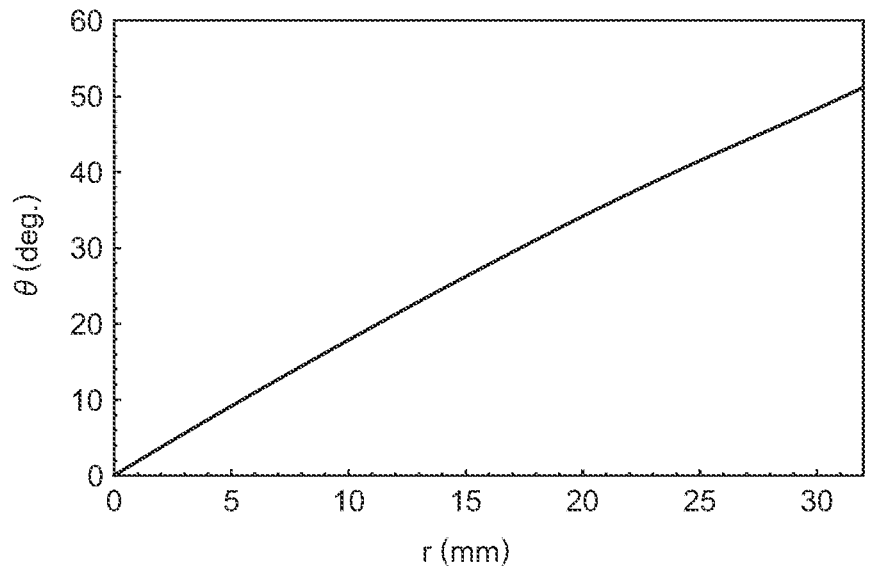
FIG. 18 shows a relationship between r and tangential angle θ on the surface S1 provided with the diffractive structure of the lens of Example 3.

FIG. 18 shows a relationship between r and tangential angle θ on the surface S1 provided with the diffractive structure of the lens of Example 3. The horizontal axis of FIG. 18 indicates distance r from the optical axis, and the unit is millimeter. The vertical axis of FIG. 18 indicates tangential angle θ represented by Expression (2), and the unit is degree.

Figure 19:
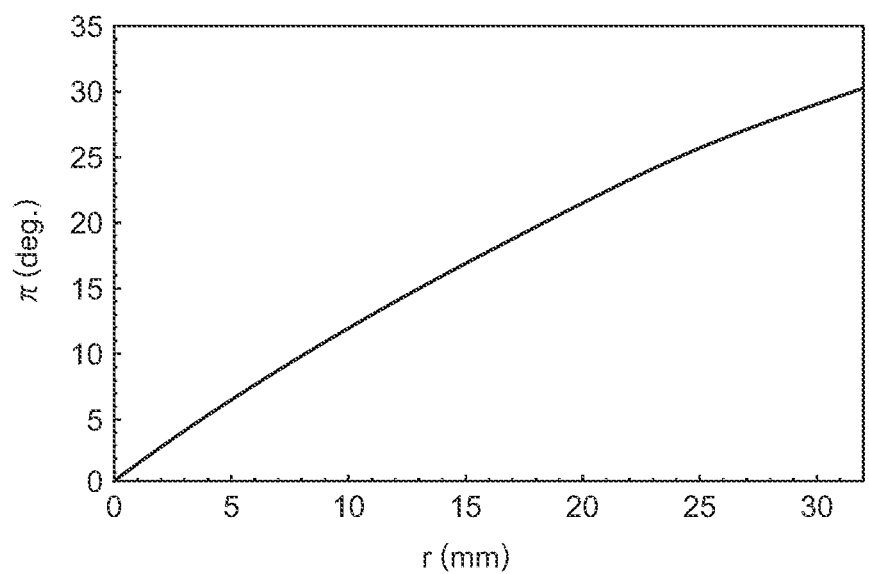
FIG. 19 shows a relationship between r and angle of incidence MO of a ray of light onto the surface S1 provided with the diffractive structure of the lens of Example 3.

FIG. 19 shows a relationship between r and angle of incidence II(r) of a ray of light onto the surface S1 provided with the diffractive structure of the lens of Example 3. The horizontal axis of FIG. 19 indicates distance r from the optical axis, and the unit is millimeter. The vertical axis of FIG. 19 indicates angle of incidence II(r) of a ray of light represented by Expression (7), and the unit is degree.

Figure 20:
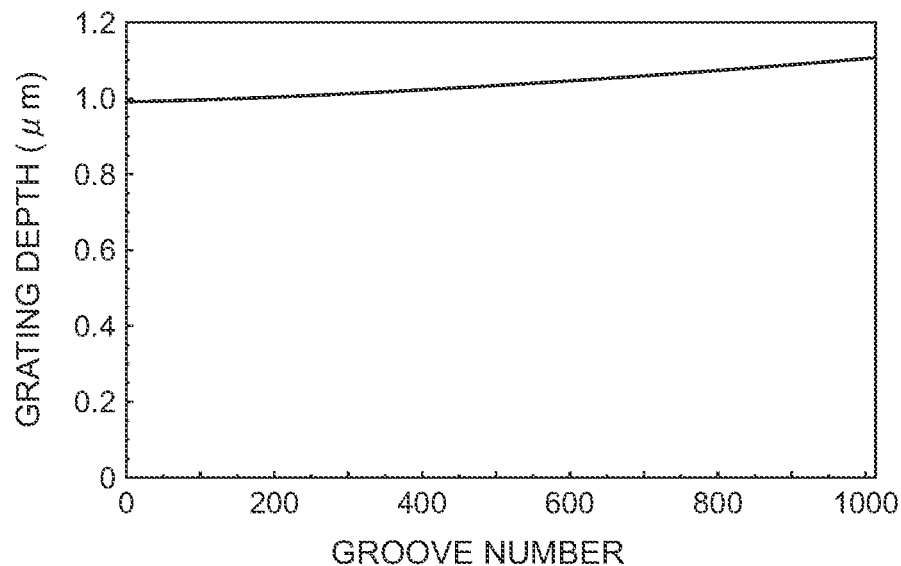
FIG. 20 shows a relationship between groove number and grating depth corresponding to each groove (depth of groove) in the diffractive structure of the lens of Example 3.

FIG. 20 shows a relationship between groove number and grating depth of each groove (depth of groove) in the diffractive structure of the lens of Example 3. The groove numbers are assigned sequentially from the optical axis to the periphery of the lens. The horizontal axis of FIG. 20 indicates groove number. The vertical axis of FIG. 20 indicates grating depth of each groove, and the unit is micrometer.

Figure 21:
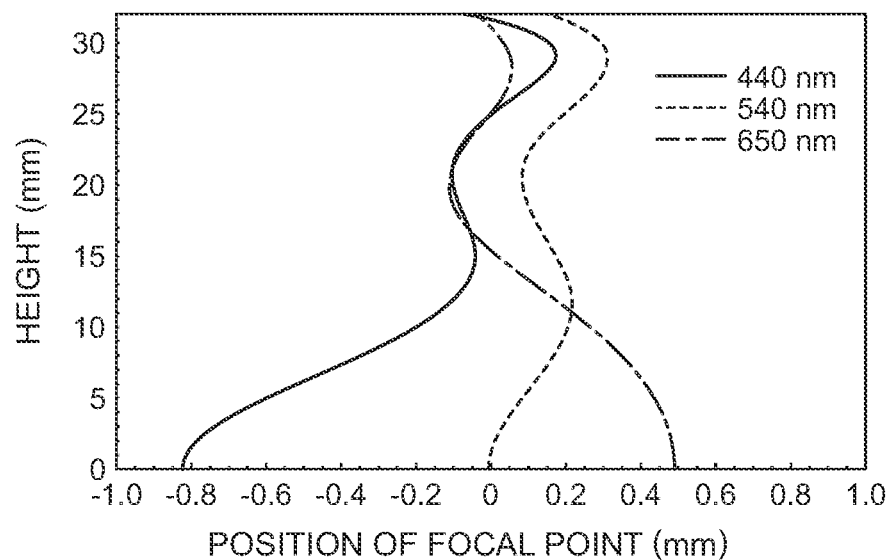
FIG. 21 shows spherical aberrations of the lens provided with the diffractive structure of Example 3.

FIG. 21 shows spherical aberrations of the lens provided with the diffractive structure of Example 3. The horizontal axis of FIG. 21 indicates position of focal point along the optical axis, and the unit is millimeter. The vertical axis of FIG. 21 indicates image height, that is, height of incident rays parallel to the optical axis with respect to the optical axis, and the unit is millimeter. According to FIG. 21, the longitudinal chromatic aberration is 1.3 millimeters. In the whole range of image height, a difference in spherical aberration between the maximum value and the minimum value for each wavelength is equal to or less than the value of the longitudinal chromatic aberration. The effective radius R is 32 millimeters, and in the range of $r/R \geq 0.3$ of the vertical axis, a difference in spherical aberration between the maximum value and the minimum value for each wavelength is equal to or less than 30% of the value of the longitudinal chromatic aberration.

Figure 22:
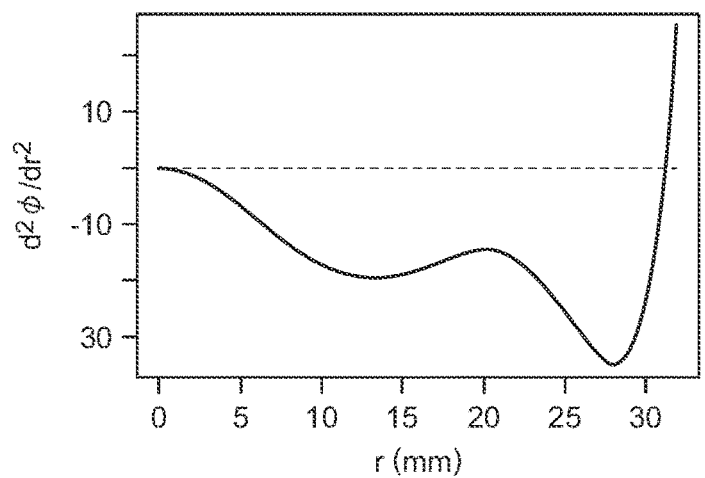
FIG. 22 shows second derivative with respect to r of the phase function of Example 3.

FIG. 22 shows second derivative with respect to r of the phase function of Example 3. The horizontal axis of FIG. 22 indicates r, and the unit is millimeter. The vertical axis of FIG. 22 indicates second derivative.

Figure 23:
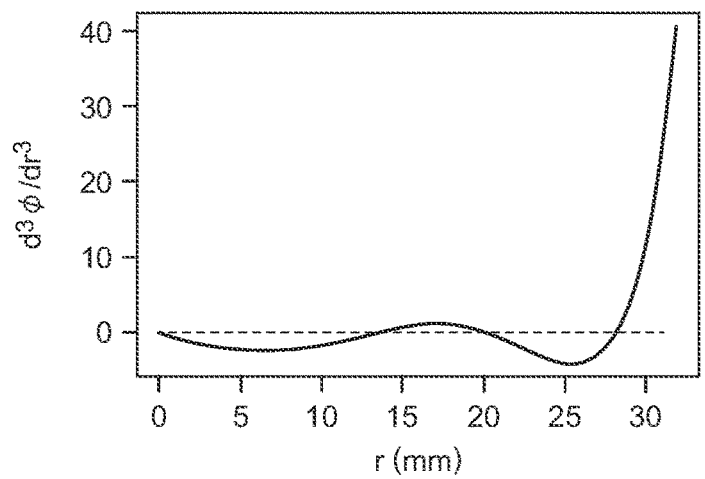
FIG. 23 shows third derivative with respect to r of the phase function of Example 3.

FIG. 23 shows third derivative with respect to r of the phase function of Example 3. The horizontal axis of FIG. 23 indicates r, and the unit is millimeter. The vertical axis of FIG. 23 indicates third derivative.

Figure 24:
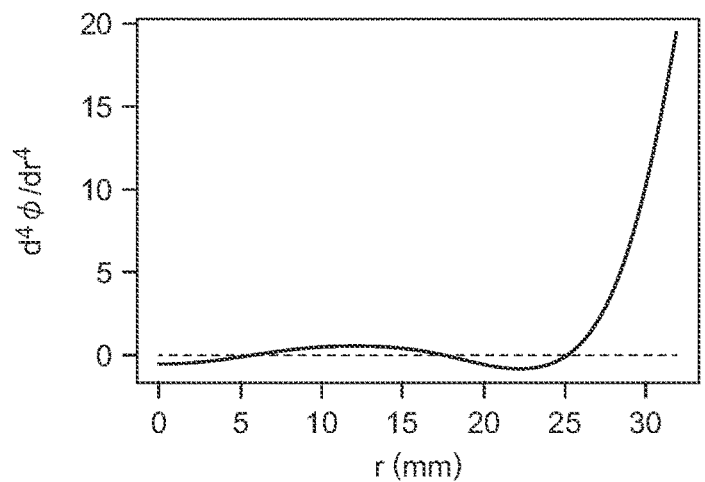
FIG. 24 shows fourth derivative of r of the phase function of Example 3.

FIG. 24 shows fourth derivative with respect to r of the phase function of Example 3. The horizontal axis of FIG. 24 indicates r, and the unit is millimeter. The vertical axis of FIG. 24 indicates fourth derivative.

According to FIGS. 22-24, second derivative with respect to r of the phase function has extreme values at r=14, r=20 and r=28, and has points of inflection at r=7, r=18 and r=25. The effective radius R is 32 millimeters, and second derivative with respect to r of the phase function has three extreme values and two points of inflection in the range of $r/R \geq 0.3$, and has two extreme values and two points of inflection in the range of $r/R \geq 0.5$.

Table 10 shows values of focal length of the lenses of Examples 1-3.

TABLE 10

| | Focal length [mm] |
|---|---|
| Example 1 | 67.5563 |
| Example 2 | 58.1286 |
| Example 3 | 58.5073 |

Table 11 shows values of diameter of entrance pupil and diameter of exit pupil of the lenses of Examples 1-3 when the light source side of the lens is defined as the image side.

TABLE 11

| | Diameter of entrance pupil | Diameter of exit pupil |
|---|---|---|
| Example 1 | 70.00 mm | 72.68 mm |
| Example 2 | 64.00 mm | 67.06 mm |
| Example 3 | 64.00 mm | 65.63 mm |

Next, the light source 200 of the illumination optical system will be described below. The light source 200 of the illumination optical system includes a surface having luminance in a predetermined range, and the area of the surface should preferably be equal to or greater than 3% of the area of the above-described entrance pupil. The surface can be a single smooth curved surface. Alternatively, the surface can be a combination of plural curved surfaces, a combination of plural flat surfaces, or a combination of a single curved surface or plural curved surfaces and a single flat surface or plural flat surfaces. The surface is placed such that distance between the surface and the curved surface representing curvature of field when the light source side of the lens is defined as the image side is equal to or less than 3%, more preferable equal to or less than 1% of the focal length of the lens 100.

By way of example, the surface of the light source 200 can be the curved surface representing curvature of field. The point of intersection between the curved surface representing curvature of field and the optical axis is the focal point of the lens 100.

Figure 25:
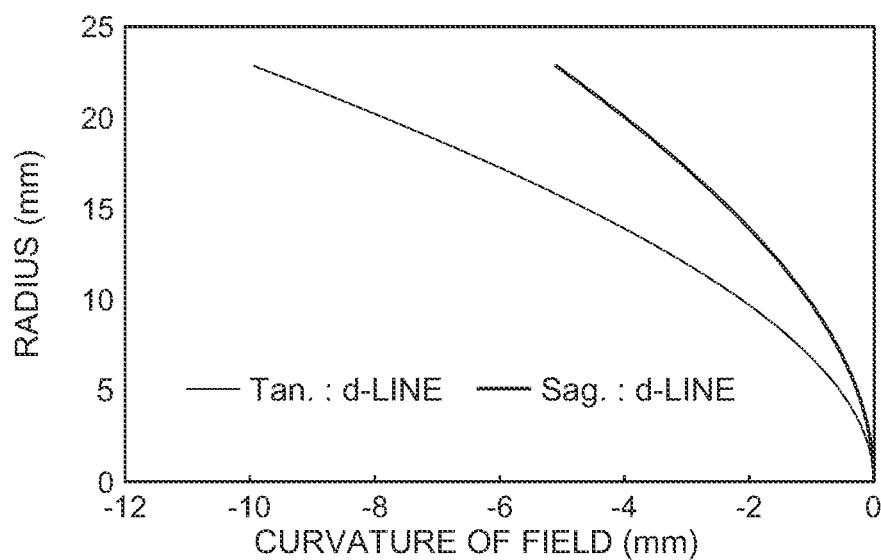
FIG. 25 shows curvature of field of the lens of Example 1 when the light source side of the lens is defined as the image side.

FIG. 25 shows curvature of field of the lens 100 of Example 1 when the light source side of the lens is defined as the image side. The horizontal axis of FIG. 25 indicates coordinate along the optical axis, and the vertical axis of FIG. 25 indicates distance r from the optical axis. In FIG. 25, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

Figure 26:
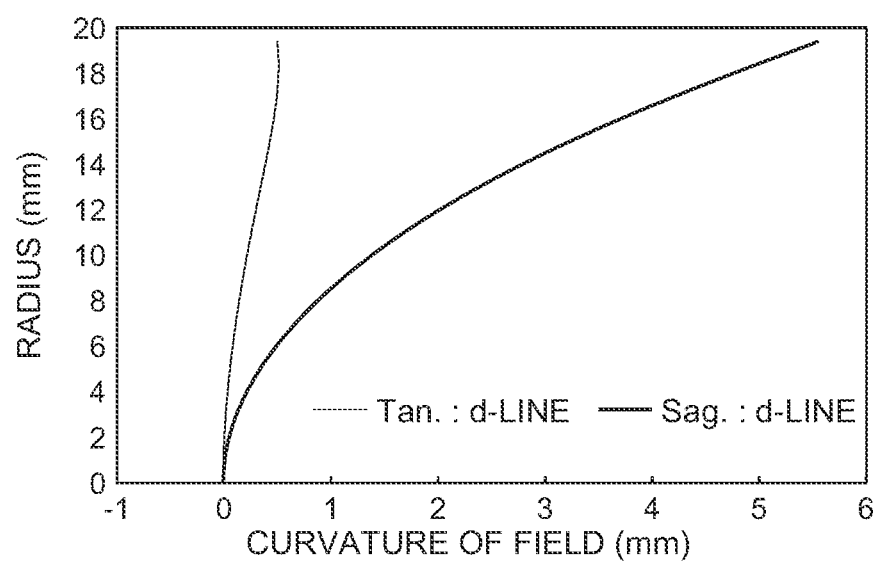
FIG. 26 shows curvature of field when the surface of the light source is formed along the curvature of field shown in FIG. 25.

FIG. 26 shows curvature of field when the surface of the light source is formed along the curvature of field shown in FIG. 25. The horizontal axis of FIG. 26 indicates coordinate along the optical axis, and the vertical axis of FIG. 26 indicates distance r from the optical axis. In FIG. 26, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

Figure 27:
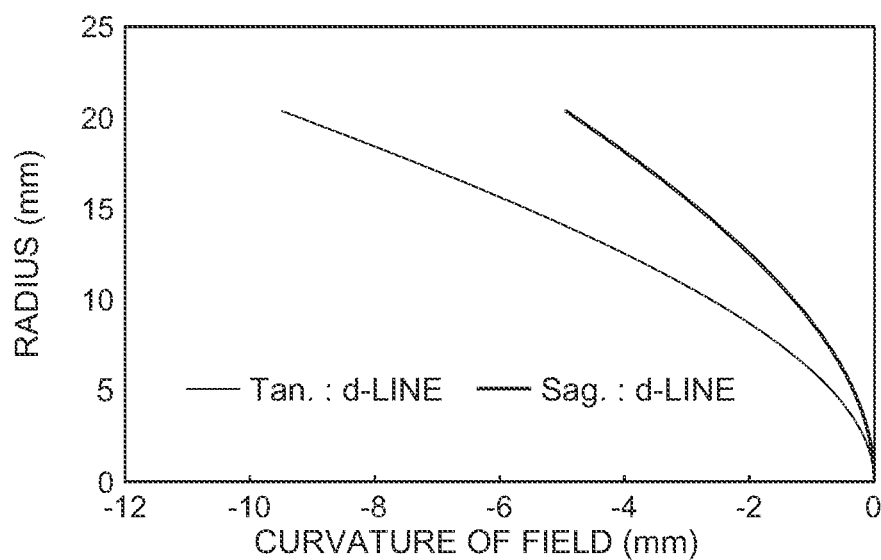
FIG. 27 shows curvature of field of the lens of Example 2 when the light source side of the lens is defined as the image side.

FIG. 27 shows curvature of field of the lens 100 of Example 2 when the light source side of the lens is defined as the image side. The horizontal axis of FIG. 27 indicates coordinate along the optical axis, and the vertical axis of FIG. 27 indicates distance r from the optical axis. In FIG. 27, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

Figure 28:
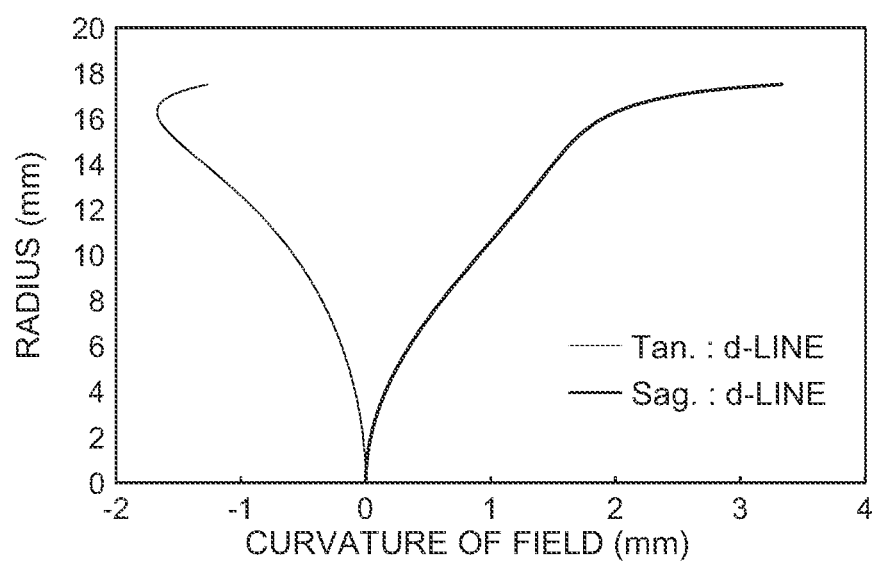
FIG. 28 shows curvature of field when the surface of the light source is formed along the curvature of field shown in FIG. 27.

FIG. 28 shows curvature of field when the surface of the light source is formed along the curvature of field shown in FIG. 27. The horizontal axis of FIG. 28 indicates coordinate along the optical axis, and the vertical axis of FIG. 28 indicates distance r from the optical axis. In FIG. 28, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

Figure 29:
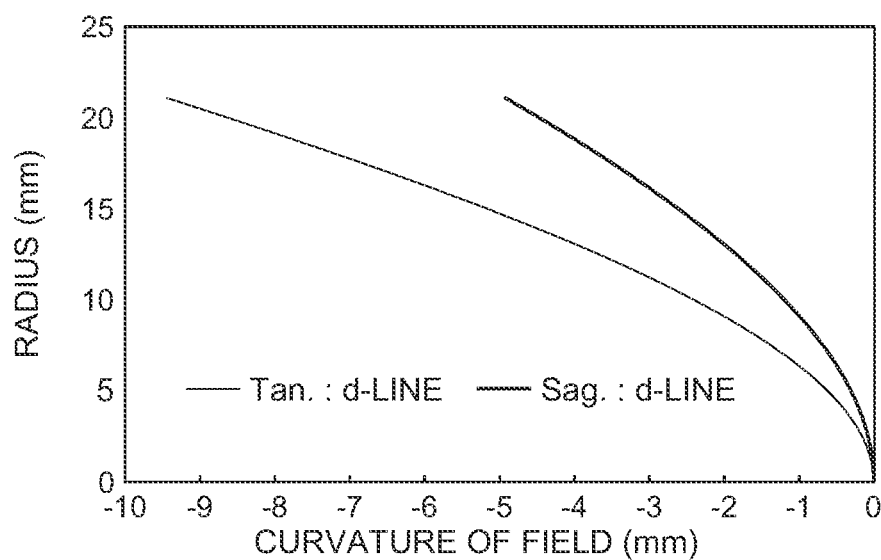
FIG. 29 shows curvature of field of the lens of Example 3 when the light source side of the lens is defined as the image side.

FIG. 29 shows curvature of field of the lens 100 of Example 3 when the light source side of the lens is defined as the image side. The horizontal axis of FIG. 29 indicates coordinate along the optical axis, and the vertical axis of FIG. 29 indicates distance r from the optical axis. In FIG. 29, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

Figure 30:
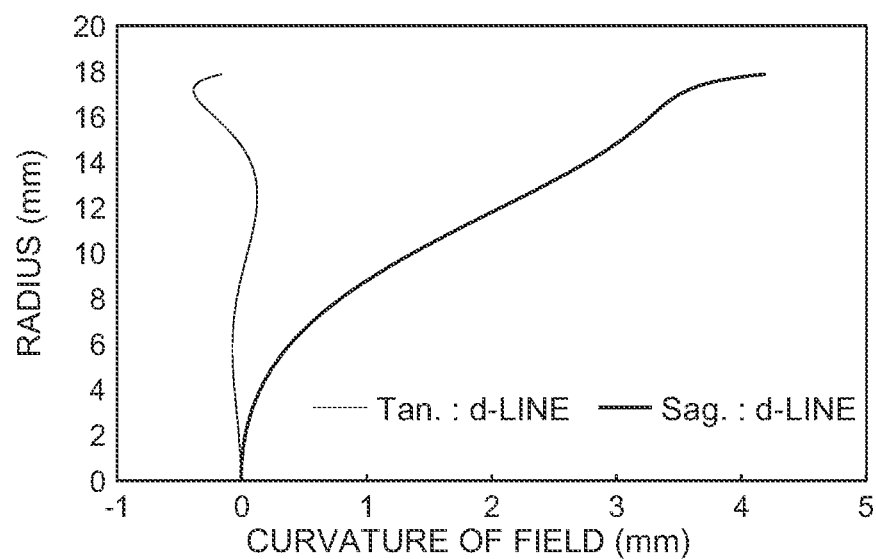
FIG. 30 shows curvature of field when the surface of the light source is formed along the curvature of field shown in FIG. 29.

FIG. 30 shows curvature of field when the surface of the light source is formed along the curvature of field shown in FIG. 29. The horizontal axis of FIG. 30 indicates coordinate along the optical axis, and the vertical axis of FIG. 30 indicates distance r from the optical axis. In FIG. 30, the thick line represents the imaging surface formed by sagittal rays of the d line (wavelength of 587.6 nm), and the thin line represents the imaging surface formed by tangential rays of the d line (wavelength of 587.6 nm). The surface containing the middle points between the two imaging surfaces described above is the surface representing curvature of field.

In general, field of curvature can hardly be corrected in a single lens. However, by the employment of a light source provided with a surface provided along a curved surface representing field of curvature, field of curvature can be corrected to a very satisfactory extent as shown in FIGS. 26, 28 and 30.

The luminance of the surface of the light source can be uneven. The luminance of the surface of the light source can be varied depending on an area to be illuminated.

Embodiments of a surface having luminance in a predetermined range will be described below. The surface (curved surface) having luminance in a predetermined range can be realized using LEDs arranged along a curved surface and covered with a light diffusion material such as frosted glass or a flexible illuminant sheet disclosed in JP2005103768A, JP2006114873 or the like. The surface (curved surface) having luminance in a predetermined range can also be realized by an intermediate imaging surface formed by another light source or end surfaces of plural light guides, the end surfaces being arranged along a curved surface.

By a combination of one of the above-described lenses and one of the above-described light sources, an illumination system provided with a single lens alone, which is capable of projecting a bright image with corrected chromatic aberrations, reduced glare and a high resolution can be realized.

What is claimed is:

1. An illumination optical system provided with a light source and a single convex lens provided with a diffractive structure on a surface thereof,
   wherein the phase function of the diffractive structure is represented by $$\phi(r) = \sum_{i=1}^{N} \beta_{2i} r^{2i}$$

where r represents distance from the central axis of the lens, β represents coefficients, and N and i represent natural numbers, and the relationship $$|\beta_2| \cdot (0.3R)^2 < |\beta_4| \cdot (0.3R)^4$$

is satisfied where R represents effective radius of the lens, and
   wherein the second derivative with respect to r of the phase function has at least one extreme value and at least one point of inflection in the range of r where r is greater than 30% of the effective radius of the lens, a difference in spherical aberration between the maximum value and the minimum value for any r in $$0 \leq r \leq R$$

is equal to or less than the longitudinal chromatic aberration for any value of wavelength of visible light, and the diffractive structure is provided at least partially in the range of r where r is greater than 30% of the effective radius of the lens, and
   wherein the light source includes a surface having luminance in a predetermined range, and the area of the surface of the light source is equal to or greater than 3% of the area of the entrance pupil when the light source side of the lens is defined as the image side.

2. The illumination optical system according to claim 1 wherein the surface of the light source is placed such that distance between the surface of the light source and a curved surface representing curvature of field of the lens when the light source side of the lens is defined as the image side is equal to or less than 3% of the focal length of the lens.

3. The illumination optical system according to claim 1 wherein the second derivative with respect to r of the phase function has at least one extreme value and at least one point of inflection in the range of r where r is greater than 50% of the effective radius of the lens, and the diffractive structure is provided at least partially on the surface in the range of r where r is greater than 50% of the effective radius of the lens.

4. The illumination optical system according to claim 1 wherein the relationship $$0 < \frac{\beta_6^2}{\beta_4 \beta_8} < 5$$

is satisfied.

5. The illumination optical system according to claim 1 wherein $\beta_4$ and $\beta_8$ are negative and $\beta_6$ is positive.

6. The illumination optical system according to claim 1 wherein depth of the diffractive structure is corrected depending on r.

7. The illumination optical system according to claim 1 wherein the both side surfaces of the lens are convex.

8. The illumination optical system according to claim 1 wherein the surface of the light source is placed such that distance between the surface of the light source and a curved surface representing curvature of field of the lens when the light source side of the lens is defined as the image side is equal to or less than 1% of the focal length of the lens.

* * * * *